UNITED STATES PATENT OFFICE.

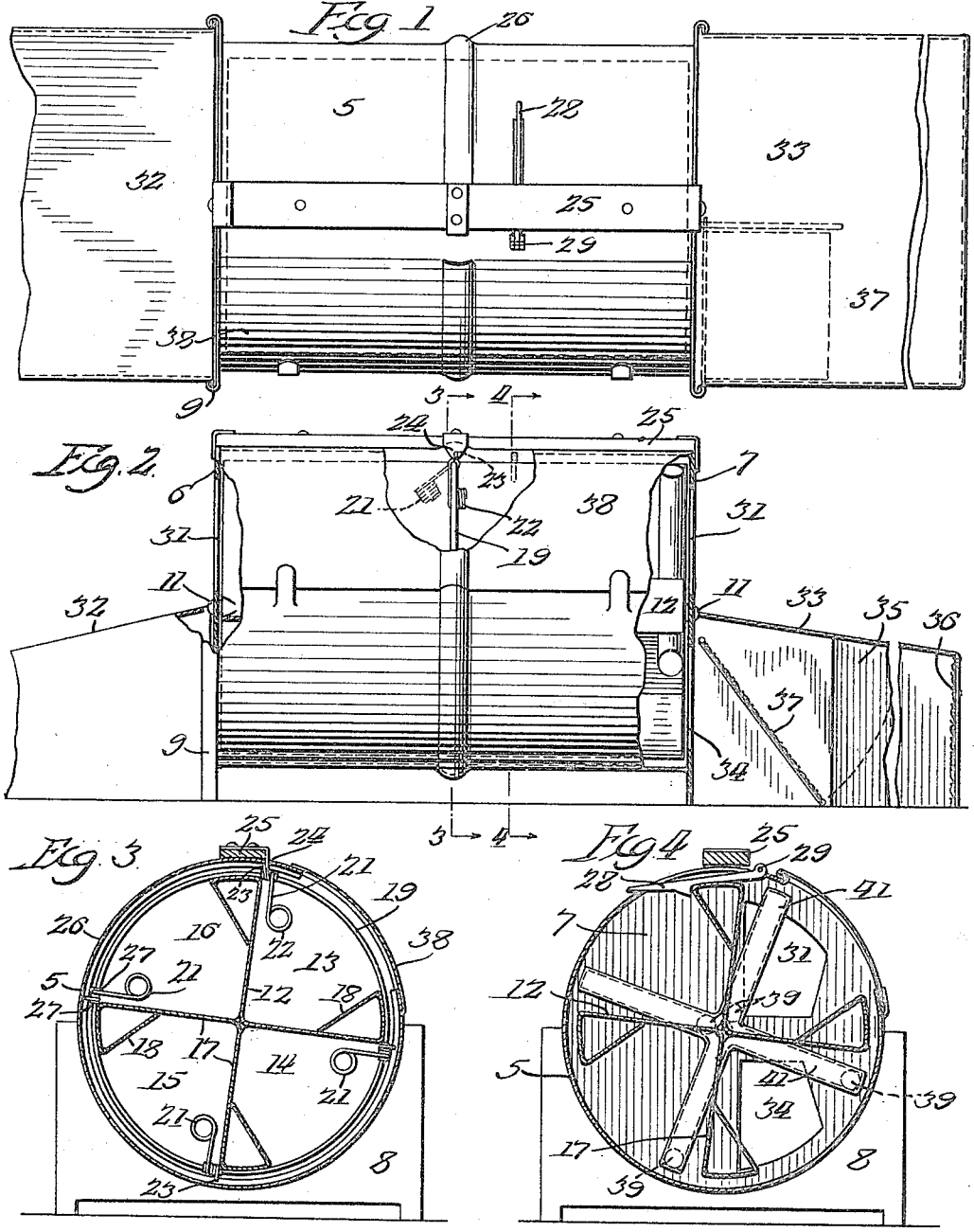

JAMES L. PATTERSON, OF FREEPORT, ILLINOIS, ASSIGNOR OF ONE-HALF TO JAMES F. PATTERSON, OF LEAF RIVER, ILLINOIS.

ANIMAL-TRAP.

1,231,782.   Specification of Letters Patent.   Patented July 3, 1917.

Application filed January 6, 1917. Serial No. 141,012.

*To all whom it may concern:*

Be it known that I, JAMES L. PATTERSON, a citizen of the United States, residing at Freeport, in the county of Stephenson and State of Illinois, have invented certain new and useful Improvements in Animal-Traps, of which the following is a specification.

This invention relates in general to traps, and has more particular reference to cage traps especially adapted for trapping various kinds of small animals, such as mice, rats, and gophers.

One of the main objects of the invention is to provide a cage trap having a plurality of trap compartments arranged and controlled so that each time an animal is caught in a compartment located in set position the same will be moved to a trapped position and a new compartment moved to the set position, the action being entirely automatic and might be carried on indefinitely, the only attention necessary being to supply new bait to the trap compartments.

I have also aimed to avoid the use of springs or spring catches or jaws which are invariably a source of danger in setting traps, and have provided a trap in which the act of catching an animal in a trap compartment causes a new compartment to be set in trapping position.

Another object is to provide in a cage having a revoluble multi-compartment trap, novel means for automatically locking the trap at certain positions in its rotation, and novel means for allowing the trap to be revolved, all of which will be more particularly described hereinafter.

Referring to the drawings,—

Figure 1 is a plan view of an animal trap embodying my improvements;

Fig. 2 is a side elevation of the trap with portions broken away to show the interior construction; and Figs. 3 and 4 are cross-sectional views through the trap taken respectively, on the lines 3—3 and 4—4 of Fig. 2.

A suitable cage houses the trap and is preferably of cylindrical form, consisting of a substantially perforate cylindrical casing 5 arranged on a horizontally disposed axis and provided with fixed end walls 6 and 7. It is not necessary, however, that the cage be of a perforate construction, as in some instances it might be equally well formed of wire mesh material. The ends 6 and 7 of the cage are shaped to provide leg portions 8 which support the cage in proper position and also provide upright flanges 9 serving as a means for attaching housings or walkways to the ends of the cage, as will be described later.

Revolubly mounted within the cage on pivot pins 11 concentric with the longitudinal axis of the cage is a trap structure designated generally by reference character 12. This trap structure provides a plurality of circumferentially spaced compartments extending lengthwise of the cage so that when the trap structure is revolved the compartments will be revolved in unison and will be successively moved from a set operative position in the upper portion of the cage to a trapped position in the lower portion of the cage. In the present instance, I have illustrated the trapping structure as containing four trapping compartments 13, 14, 15 and 16 formed by radially extending division walls 17 fixedly secured together at their inner ends in any suitable manner and having their outer ends turned to provide raised or inclined walls 18, as clearly shown in Fig. 3. These walls may be very simply formed of two pieces of sheet metal bent to the required shape and secured together at the center, as the drawing illustrates. The outer ends of the division walls are tied together or braced so as to be rigidly held in proper relative relation by means of a ring 19 suitably secured to the walls centrally between the ends thereof. This ring also serves to carry a series of bait holders which will be presently described.

Means is provided for holding the trapping structure or device in set position so that only one of its compartments is adapted to serve at one time as the trapping compartment and to combine with this holding or locking means a bait holder adapted to be actuated by an animal in this single compartment to release the locking means and allow the trapping structure to be revolved by the weight of the animal. In the instance illustrated the trapping structure will be revolved a quarter of a revolution, thereby bringing a new compartment into set position and allowing the animal to be dropped or carried downwardly as the previously set compartment moves downwardly to a trapped position. The bait holder and locking means, one of which is provided for each compartment, consists of a member 21 pivotally mounted on the ring 19 adjacent to one of the straight walls of the compartment and having a suitable bait holder 22 projecting into the compartment and a finger or stop 23 projecting outwardly beyond the ring. A fixed stop 24 is located in the path of the stops 23 projecting downwardly into the cage and may be either rigidly secured thereto, or to some fixed part such as a top bar 25 serving in this instance as a reinforcement to the top of the cage. The lower end of the stop 24 is comparatively narrow so that when a stop member 23 is in abutting relation with the stop 24, it may be swung laterally in either direction beyond the stop 24 to allow the trapping structure to be revolved in a clockwise direction viewing Fig. 3. In this connection it will be noted that the bait holder 22 is in effect a pivotally suspended weight and will, when moved through the upper cycle of the trapping structure, assume a vertical position with its stop 23 extending outwardly so as to abut against the stop 24 when the same is reached. In order to provide clearance for the projecting stops 23 the cage may be shaped for the purpose as by providing an annular bead or depression 26. A simpler way of constructing the bait holders and the stop 23 is to form each of a single strip of wire looped about the ring 19 so as to be pivotally mounted thereon and having its ends extended in opposite directions forming the bait holder 22 and stop 23, respectively. Suitable collars or abutments 27 are provided for holding the bait and stop members against lengthwise movement on the ring 19. The means just described prevents rotation of the frame in but one direction, and for stopping rotation in the opposite direction an additional locking means is provided in the form of a gravity latch 28 pivotally mounted on the cage at 29 and arranged to engage behind an outer edge of the inclined wall 18 of the partition 17, as is clearly shown in Fig. 4. This latch may be raised by a division wall as the same passes the latch when moving in a clockwise direction and the latch will automatically drop back into locking position when the portion 18 of the wall has passed the hook of the latch.

It will be noted, viewing Figs. 3 and 4, that the locking means are arranged to lock the trapping structure in a position wherein its division walls are substantially vertically and horizontally disposed. In this position the compartment 13 may be considered as set in trapping position and entrance to the compartment is afforded through openings 31 through the end walls 6 and 7. Since these openings are positioned somewhat above the floor level, walk-ways 32 and 33 may be provided, the same having outwardly turned flanges interlocking the flanges 9, although any suitable means may be provided for forming an entrance way to the openings 31. The compartment 14 immediately below the compartment 13 has an exit opening 34 through the end wall 7, and viewing Fig. 2 it will be noted that the opening 34 leads to a supplemental cage 35, the top of which is the walkway 33. The wall 36 of this supplemental cage is preferably imperforate so as to admit light and attract attention of an animal within the compartment 14 so that it will leave the compartment through the opening 34. In so doing the animal will raise and pass by an imperforate inclined gate 37. The sides of the gateway are closed so that when the animal has passed and the gate has dropped back to normal position the animal is effectually trapped within the casing 35.

Assuming the bait holders 22 to be properly baited, which may be done by removing a suitable cover 28 at one side of the cage, and the trapping structure to be locked in the position shown in Fig. 3, the trap is set. An animal entering the compartment through either entrance 31 will in attempting to obtain the bait swing the holder 22 sidewise, thereby moving the stop 23 from behind the stationary stop 24 and allowing the trapping structure to revolve in a clockwise direction, due to the weight of the animal. When the trap structure has revolved a quarter of a revolution the next succeeding stop 22 will prevent further rotation of the trap and the latch 28 will fall into place, thereby fully locking the trap in set position again. Thus a new trap compartment is moved to set position and the one containing the animal has been moved to a lowered or trapped position. Since the compartment in which the animal is trapped is in darkness, the lighted opening will cause the animal to instinctively pass out through this opening into the supplemental cage 35 as described above.

To insure locking of the trapping structure in set position I have provided means for imparting a final movement to the structure so that it will be positively rotated a sufficient distance to allow the latch 28 to be properly engaged. This means consists of a ball weight 39 for each compartment confined in a radially extending guideway 41 fixed to the trapping structure adjacent to the wall 7 and arranged in the manner shown so that the weight, with the compartment in set position, will be located at the inner end of the guideway and when the trapping structure is revolved this weight will pass by gravity to the outer end of the compartment. The ball in passing to its outer position will give an additional rotative impulse to the cage structure causing it to be positively moved to final set position.

From the foregoing it will be manifest that I have provided an animal trap in which the operation is entirely automatic and may be also said to be continuous with the exception that new bait must be supplied from time to time. The main cage contains upper and lower entrance and exit openings, respectively, and the revoluble trapping structure within the cage provides a plurality of trapping compartments movable successively into registration with these openings and is controlled in such movement by a locking means of novel construction. A bait in each compartment coöperates with the locking means and serves, when actuated, to release a compartment set in registration with the inlet opening so that this compartment will be moved downwardly into registration with the exit opening, at the same time a new compartment being moved to set position. These features give a practical and effectual animal trap positive and automatic in operation and entirely unharmful to the one baiting the trap or to the animals being caught.

While I have shown and described a particular mechanical embodiment of my improvements it should be understood that various changes may be made in the arrangement and construction of the essential parts without departing from the spirit or scope of the invention as expressed in the appended claims.

I claim:

1. In an animal trap, the combination of a cage having an entrance and an exit opening, a revolving trap therein having a plurality of compartments each adapted to register successively with said openings, means for automatically locking the trap in set position with one of its compartments in registration with the entrance opening, including a bait holder movable to allow the trap to be released and revolved to move a new compartment into set position and to move the previously set compartment into registration with the exit opening, and means for automatically imparting a final revolving movement to the trap each time it is released so as to insure setting of the trap in position again.

2. In an animal trap, the combination of a cage having an upper entrance and a lower exit opening, a trap revoluble therein and having a plurality of compartments successively movable by rotation of the trap into registration with said entrance and exit openings respectively, means for automatically locking the trap in position with one of its compartments in registration with the entrance opening upon movement of the trap to such position, including a bait holder mounted to swing freely back and forth and to gravitate to a locking position when its trap compartment is moved to trapping position.

3. In an animal trap, a revoluble trap having a plurality of trapping compartments, the division walls of which are circumferentially spaced, a ring member circumscribing said compartments and secured to the division walls thereof, a fixed stop, and a combined bait holder and stop for each compartment pivotally mounted on the ring member and adapted by swinging movement of its bait holder portion to move its stop portion into and out of locking relation with said fixed stop.

4. In an animal trap, a revoluble trap having a plurality of trapping compartments movable successively to a set position, means for locking the trap in and releasing it from said set position, and weighted means movable with and relatively to the trap and arranged to give a final revolving impulse to the trap when it is moved to set position to thereby insure setting of the trap.

5. In an animal trap, a revoluble trap having a plurality of trapping compartments movable successively to a set position, and a weighted member for each compartment movable upon a radially extending guideway so arranged that the weight will gravitate thereon in a manner to give a final revoluble impulse to the trap to insure setting of the same.

6. In an animal trap, a revoluble trap having a plurality of trapping compartments, a cage about the trap having an entrance opening with which said trapping compartments may successively register by revolving the trap, a bait holder mounted on the trap in each compartment and having connected therewith a stop coöperable with a stop connected with the cage to hold the trap in set position, said bait holder being so mounted as to be movable in a direction parallel with the passage of an animal entering the trap through said entrance opening for causing said stops to be disengaged to thereby release the trap from set position.

JAMES L. PATTERSON.

Copies of this patent may be obtained for five cents each, by addressing the "Commissioner of Patents, Washington, D. C."